March 13, 1956 W. S. BACHMAN 2,738,385

SOUND RECORDING APPARATUS

Filed Aug. 19, 1952 3 Sheets-Sheet 1

INVENTOR.
William S. Bachman

BY

Pennie, Edmonds, Morton, Barrows and Taylor
ATTORNEYS

INVENTOR.
William S. Bachman
BY
Pennie, Edmonds, Morton, Barrows and Taylor
ATTORNEYS

SOUND RECORDING APPARATUS

INVENTOR.
William S. Bachman
BY Pennie, Edmonds, Morton, Barrows and Taylor
ATTORNEYS United States Patent Office 2,738,385

Patented Mar. 13, 1956

2,738,385

SOUND RECORDING APPARATUS

William Stephen Bachman, Southport, Conn., assignor to Columbia Broadcasting System, Inc., New York, N. Y., a corporation of New York Application August 19, 1952, Serial No. 305,259

16 Claims. (Cl. 179—100.4)

This invention relates primarily to the variable pitch recording of phonograph records, and particularly to automatic apparatus therefor.

In making phonograph records it is desirable to be able to record as much information as possible on a given area of the recording medium. For example, in ordinary disc-type phonograph records it is desirable to record as much music, etc. as possible on one side in order to avoid frequent changes. The introduction of so-called long-playing records has made it possible to increase greatly the playing time while still permitting excellent quality reproduction. Such records commonly rotate at 33⅓ R. P. M. rather than the theretofore conventional 78 R. P. M., and employ much finer grooves. For example, a 12" record rotating at 33⅓ R. P. M. and having approximately 224 grooves per radial inch yields playing times up to approximately 20 minutes per side. A groove width of 2.7–3.0 mils (thousandths of an inch) has been found to be satisfactory for adequate tracking stability during reproduction.

An advantage of such long-playing records is that a complete musical selection, or one or more complete movements of a symphony, concerto, etc., may be recorded on one side of a record. This avoids interrupting the music in the middle of a selection or movement and hence is esthetically more satisfying. In some instances, however, even with 20 minutes playing time available, it is found that a complete selection or one or more movements of a large work cannot be recorded on a single side. In such cases it is highly desirable to have a few minutes extra time available.

The extra playing time can be made available by increasing the diameter of the record, but 12" records are the largest which can be accommodated by the usual home player. The groove pitch can be reduced somewhat, but there is a limit imposed by the danger of overcutting which breaks down the barrier between grooves and hence causes skipping of grooves during reproduction, or repeated reproduction of the same groove. Even though the barrier between grooves may not be broken down, if the grooves approach too closely the sound modulation in one groove may deform the wall of the adjacent groove with resultant distortion. To prevent such overcutting or groove distortion, the width of the groove could be reduced, or the amplitude displacement for a given volume level reduced. This is undesirable, however, since conventional playing equipment is designed for a given groove width and any decrease may impair proper tracking. Reduction of displacement amplitude for a given volume level reduces the overall volume range which can be recorded, inasmuch as the minimum recording level is determined by the noise level, and also necessitates increased amplification.

It has heretofore been proposed to increase the playing time of records by varying the pitch of the record grooves in accordance with the volume level of the music or other sounds to be recorded. For soft passages the groove pitch is decreased and for loud passages it is increased. In this manner considerable extra playing time can be obtained without reducing either the groove width or the recording level. Although obviously advantageous, variable pitch recording has not come into widespread use due to the difficulty of providing proper apparatus.

It is a principal object of the present invention to provide apparatus for variable pitch recording which functions automatically and reliably, without impairing the fidelity of the recording.

In accordance with the invention separate control and recording channels are provided, and the sound signal to be recorded is supplied to both channels. In order to allow time for the groove pitch to be altered as required, prior to the recording of the signal, the sound signals to the recording channel are delayed with respect to the corresponding signals in the control channel. Advantageously the delay is approximately the time required for one revolution of the record blank.

The recording channel preferably includes an amplifier and recording equalizer for feeding signals to the recording head. The equalizer in this channel is designed to alter the sound signal in accordance with a predetermined displacement-frequency record characteristic so that the lateral displacement of the record groove during modulation will follow a selected standard. The equalizer is further designed to compensate at least partially for the non-linearity of the displacement-frequency characteristic of the recording head. The design of the amplifier and recording equalizer may follow conventional practice.

In the control channel an amplifier and control equalizer are preferably provided. This control equalizer differs, generally speaking, from the equalizer in the recording channel. In order that the control signal will represent the actual required displacement of the recording stylus, the sound signals in the control channel are advantageously equalized for the record characteristic, but not for the recording head characteristic. The equalized signal is then supplied to a rectifier circuit to obtain a control wave which varies with the amplitude of the equalized signal.

It is possible to use the control signal in many different ways to control the groove pitch. It is preferred to utilize the control signal to vary the frequency of an electronic oscillator, and to employ the output of the oscillator to drive a synchronous motor which in turn produces relative displacement of the recording head and record blank.

In the prior art, it has been suggested to employ a D.-C. motor and vary the voltage applied thereto by means of a resistance. Such a system is subject to many disadvantages in use. For example, the speed of the motor will vary with the load thereon, the load being primarily frictional and hence subject to considerable variation. The speed will also depend upon the power line voltage and upon ambient temperature conditions. These factors, among others, greatly complicate the problem of precise speed control. As will be pointed out hereinafter in considering a specific embodiment, there is very little latitude allowed in modern fine-groove recording so that unless the pitch is precisely controlled there is serious danger of overcutting. If a factor of safety is provided to avoid overcutting, full advantage is not obtained from the use of variable pitch recording for increasing the playing time.

The use of a variable frequency oscillator and synchronous motor has been found advantageous in order that the proper change in pitch may be obtained simply and reliably, despite variations in power line voltage, temperature, and load on the driving motor.

Advantageously, the oscillator is of the type in which the frequency of oscillation is determined by a resistance-capacitance circuit in a feedback loop, and an electronic tube is employed as a variable resistance to change the frequency. Preferably the oscillator is of the so-called Wien bridge type employing two resistances and two capacitances in the feedback loop, and the resistances and capacitances have equal values respectively. Accordingly, in the preferred embodiment of the invention two electronic tubes are employed as the two resistances, and the plate resistances of the tubes are controlled by control waves from the rectifier circuit. The time constants in the control channel are important in order to secure the most satisfactory operation, and will be explained hereinafter.

The invention will be more fully understood by reference to the following description of a specific embodiment thereof, taken in conjunction with the drawings in which.

Figures 3, 4, 6:
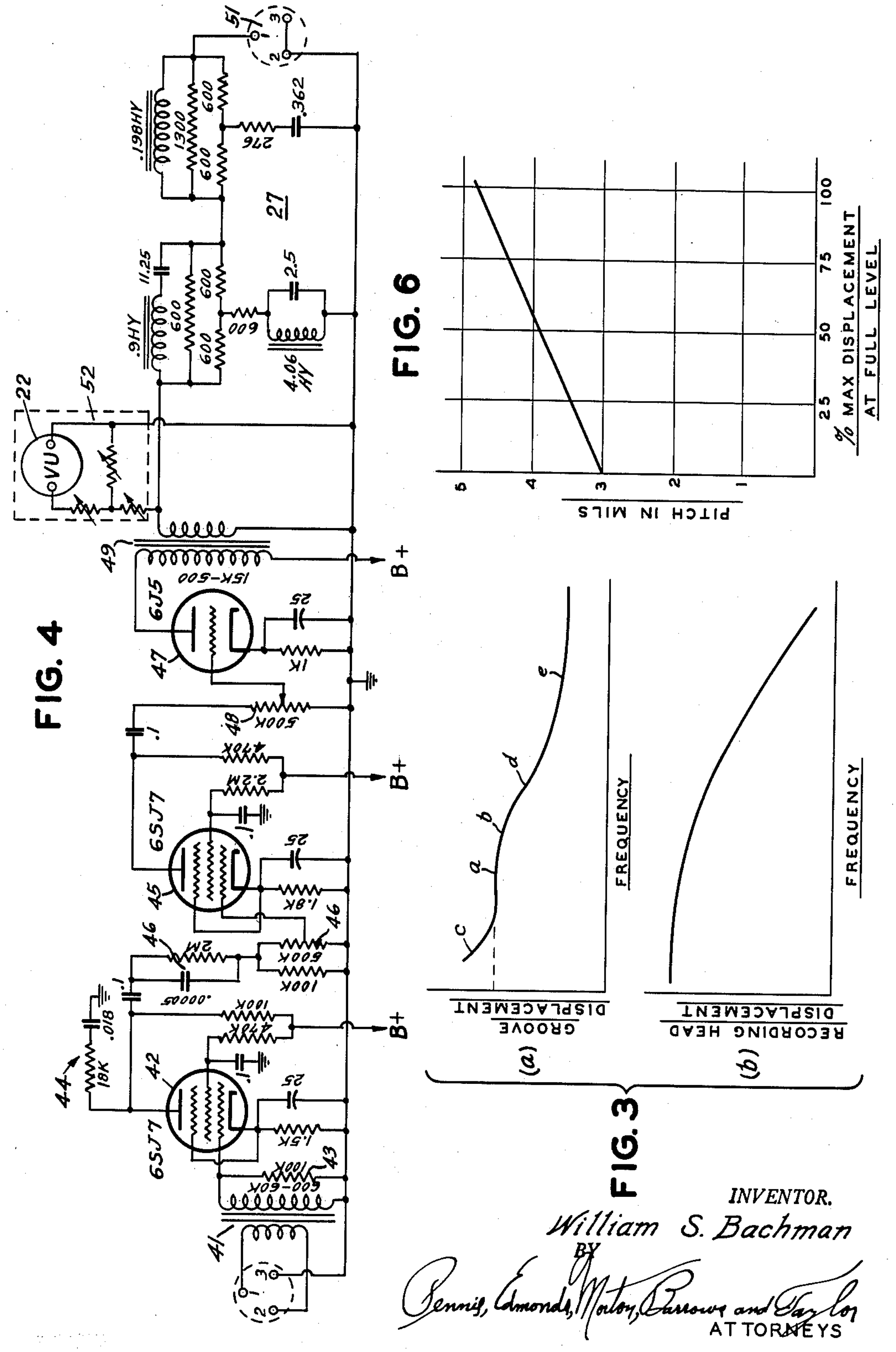
Figure 5:
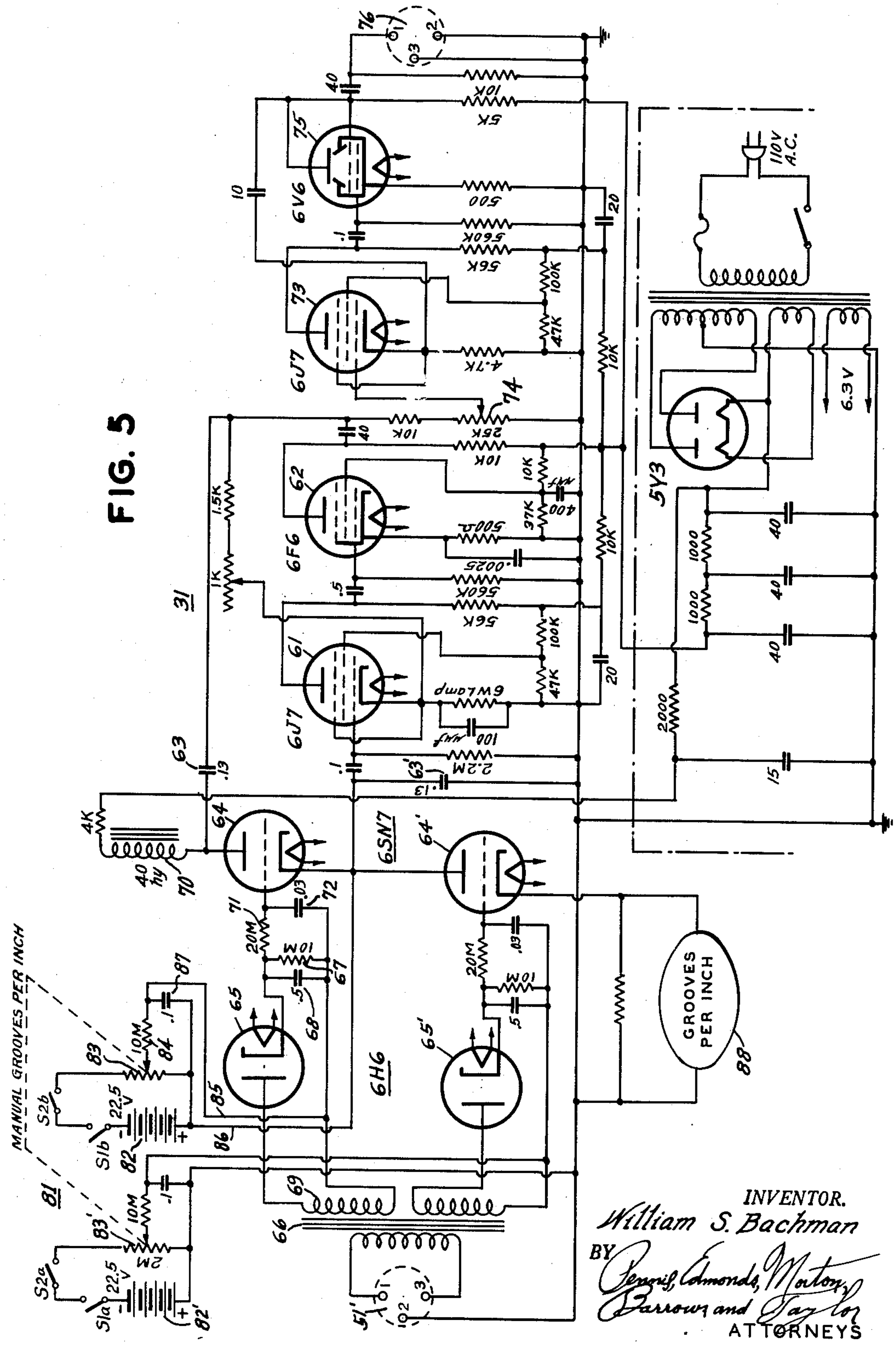

Figs. 3(*a*) and 3(*b*) are representative record and recording head characteristics, respectively;

Fig. 4 is a circuit diagram of the amplifier and equalizer in the control channel;

Fig. 5 is a circuit diagram of the rectifier, controlled-frequency oscillator and motor-driving amplifier in the control channel; and Fig. 6 is a curve representing change in pitch with recording level.

Figure 1:
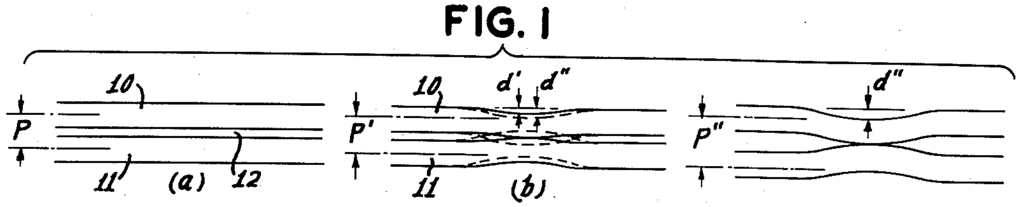
Fig. 1 illustrates certain groove relationships.

Referring to Fig. 1(*a*), a pair of unmodulated grooves 10 and 11 are shown, with a wall or "land" 12 therebetween. The pitch *p* is shown as the distance between the center lines of adjacent grooves. Actually, the grooves 10 and 11 depict portions of adjacent convolutions of a continuous spiral groove as commonly employed in the conventional record disc. They are here shown as straight grooves for simplicity of illustration.

Fig. 1(*b*) illustrates grooves of given pitch *p'* as modulated by sound. Sound modulation produces a lateral displacement *d'* of groove 10 during recording so as to produce a corresponding displacement of a stylus during reproduction. Groove 11 is likewise shown as modulated, and the condition here shown is where the two grooves are modulated in opposite directions with the peaks coinciding. As shown in full lines, the modulation produces a sufficient displacement to cause the grooves to touch. If the displacement is greater, the groove wall will be broken down and mistracking is likely to occur. This condition is shown in dotted lines, and the corresponding displacement indicated as *d''*. Even though the wall is not broken down, if one groove approaches the other too closely the sound modulation in one groove is likely to deform the side of the adjacent groove to produce cross modulation therein, with resultant distortion.

In order to provide room for the displacement *d''*, the pitch of the grooves may be increased as indicated at *p''* in Fig. 1 (*c*). Here the pitch has been increased just enough to cause adjacent grooves to touch without breaking down the wall. Obviously, the pitch can be increased somewhat more than that illustrated so as to leave a small land between the grooves.

The present invention provides automatic apparatus for changing the groove pitch *p* in accordance with the volume level of the music or other sounds to be recorded. For clearness of description, the invention will be described as applied to the recording of long-playing microgroove records, and numerical data will be given which applies to one specific application. It will of course be understood that the specific values here given are for purposes of illustration only, and that the invention is not confined thereto.

In the specific embodiment here described the maximum displacement of the record groove by sound modulation at full recording level is standardized at 0.9 mil. The minimum recording level is determined by the noise level and is about 55 db below full recording level. For quiet music, averaging about 20 db below full level, a lateral displacement of about 0.1 mil is required. Allowing room for peaks of adjacent grooves to coincide, a pitch of 3.2 mils is required for a groove width of 2.7–3.0 mils. This pitch corresponds to 314 grooves per inch. The outside diameter of the playing area of a 12 inch record is approximately 11.5 inches, and the minimum usable diameter has been selected as 4.75 inches in order to maintain adequate fidelity of reproduction. With 314 grooves per inch, a total playing time of about 32 minutes can be obtained.

In the automatic pitch control apparatus to be described, a minimum pitch is selected which is determined by the groove width. This minimum pitch is selected as approximately 350 grooves per inch corresponding approximately to an unmodulated groove of 3.0 mils width. Sound modulation automatically increases this pitch by the amount necessary to allow recording without overcutting.

Figure 2:
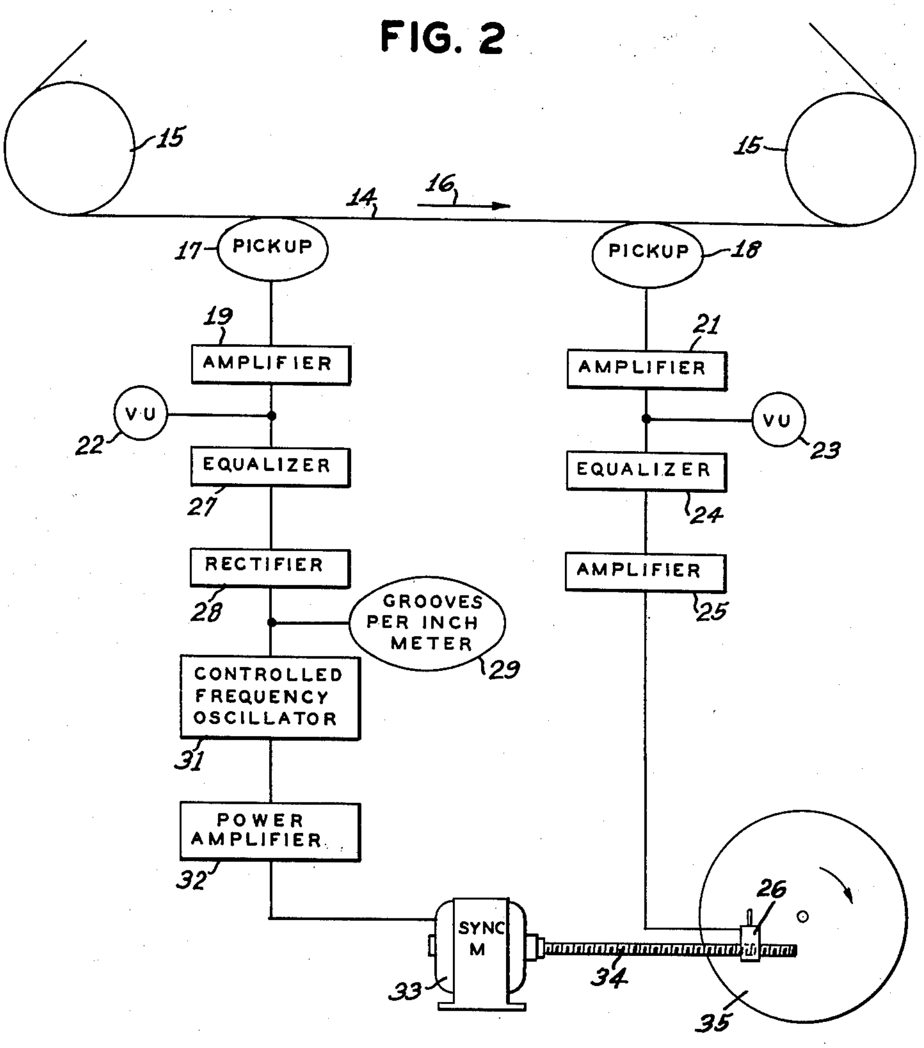
Fig. 2 is a block diagram of a preferred embodiment of the invention.

Referring to the block diagram of Fig. 2, the initial source of sound signals is here shown as a magnetic tape 14 on which sound signals have been recorded in the studio. Tape 14 runs on pulleys 15 and moves in the direction of arrow 16 at uniform velocity. A control channel pickup 17 and a recording channel pickup 18 are laterally spaced along the tape 14 so that the sound signals picked up at 18 are delayed with respect to those picked up at 17. The delay is advantageously about one revolution of the record blank, and is here assumed to be approximately two seconds.

If desired, of course, other sources of sound signals may be employed. For example, a master disc may be initially recorded instead of magnetic tape, and spaced pickups associated therewith. Or, a single pickup could be used feeding the control channel directly and the recording channel through a suitable delay line or other delay means such as the tape arrangement shown. Or, microphones could be used to pick up the original sound, one feeding the control channel directly and the other through a suitable delay circuit. These and many other possibilities will occur to those skilled in the art.

The sound signals picked up at 17, 18 pass through respective amplifiers 19 and 21. These amplifiers commonly include circuits which compensate for any deficiencies in the pickups or in the recorded material. Volume indicators 22 and 23 are advantageously provided so that sound signals in the two channels may be maintained at a predetermined relative level.

The recording channel includes an equalizer 24 and another amplifier 25 which feeds the recording head 26. As is well known, it is customary to record sound on record discs with a nonlinear frequency-displacement record characteristic. Commonly a basically constant-velocity characteristic is employed above a selected turnover frequency, say about 500 cycles. The basic constant-velocity characteristic is then altered by providing a rising characteristic above a second turnover frequency which emphasizes the high frequencies and, assuming subsequent de-emphasis in reproduction, improves the signal-to-noise ratio. Below the first turnover frequency the recording is basically constant amplitude, with a selected amount of boost at the lowest frequencies to be recorded.

A representative record characteristic is shown in Fig. 3(*a*). The flat portion *a* below the first turnover *b* has low frequency bass boost at *c*. Above the first turnover is a basically constant velocity region *d* with high-frequency boost in region *e*.

The characteristic represents the condition for a signal to be recorded of constant amplitude regardless of frequency. Equalizer 24 is designed to alter the applied signal in accordance with the desired record characteristic.

The cutting head 26 is ordinarily not perfect, and has a nonlinear frequency-displacement characteristic which must be taken into account. For example, a magnetic recording head may have a characteristic of the type shown in Fig. 3(*b*) for an applied signal of constant current regardless of frequency. Accordingly, equalizer 24 is designed to compensate for the recording head characteristic also. These principles are well known in the art and further elaboration is unnecessary.

Returning now to the control channel, the output of amplifier 19 is fed to an equalizer 27 which alters the signal so as to take into account the desired record characteristic, but preferably not the recording head characteristic. Thus the output of equalizer 27 is a signal whose amplitude corresponds to the desired displacement of the corresponding sound grooves on the record. The output of the equalizer is then passed to a rectifier 28 which is advantageously of the peak detection type. The rectified output varies in accordance with the required displacement and hence with the required number of grooves per inch. A meter 29 may be provided to inform an operator continuously of the number of grooves per inch required.

The output of the rectifier is used to control the frequency of an oscillator 31, and the oscillator output is supplied through a power amplifier 32 to a synchronous motor 33. The synchronous motor has a lead screw 34 which moves the recording head 26 along the radius of the turntable 35 on which the record blank is placed. Turntable 35 is rotated at constant speed by means not shown, so that a variation in the speed of motor 33 produces a corresponding variation in the groove pitch.

Referring now to Fig. 4, a circuit diagram of amplifier 19 and equalizer 27 in the control channel is shown. The output of pickup 17 is supplied through transformer 41 to an amplifying tube 42 here shown as of the pentode type. A resistor 43 shunts the secondary of the transformer so as to provide partial equalization of the playback characteristic of the pickup head 17. A bass boost circuit 44 is provided in the output circuit of tube 42 to compensate for the bass characteristic of the magnetic tape 14 and pickup 17. The output of tube 42 is fed to a second amplifier stage comprising pentode 45. The signal is applied to tube 45 through a high frequency boost circuit 46 so as to compensate for the high frequency characteristic of the magnetic tape 14 and associated pickup 17. A potentiometer 46 is provided in the input circuit of tube 45 so that the gain of the control channel can be adjusted.

The output of amplifier 45 is supplied to a third amplifying stage 47 through a gain control 48. The output of amplifier 47 is supplied through a transformer 49 to the equalizer generally designated as 27. The equalizer may be designed in accordance with principles well known in the art to compensate for the record characteristic as explained above. The specific values here given have been found suitable for one particular application. The output of the equalizer is fed through an outlet cable plug 51 to the circuit shown in Fig. 5.

A volume indicating meter 22 is also supplied from the secondary of transformer 49 through an attenuator 52. In use, a predetermined relationship should be maintained between the volume of the sound signals in the control channel and that in the recording channel. Thus the indication of meter 22 may be compared with that of meter 23 in the recording channel (Fig. 2) and the gain of the control channel adjusted by means of potentiometer 46 and 48.

Referring now to Fig. 5, an oscillator of the so called Wien bridge type is illustrated generally as 31. This oscillator includes two electronic amplifier tubes 61, 62 connected in cascade with a feedback circuit including capacitors 63, 63' and electronic tubes 64, 64' functioning as variable resistors. Tubes 64 and 64' have their cathode-anode circuits in series between ground and the B+ supply through choke 70. Consequently the plate impedances are in series, capacitor 63' shunts tube 64' and capacitor 63 is in series with tube 64, as required by the Wien bridge circuit.

Ordinarily Wien bridge oscillators have fixed or variable ohmic resistors at the points where tubes 64, 64' are connected. With such ohmic resistors this type of oscillator is well known and need not be described in detail. The constants shown in the drawing have been found suitable for one particular application, but are subject to considerable variation as will be understood by those skilled in the art. The frequency of oscillation is determined by the values of the capacitors and resistors in the feedback circuit. If the capacitors are equal, as here shown, and the resistors equal, the frequency is given by the equation:

$$\text{Frequency} = \frac{1}{2\pi RC}$$

where C is the capacitance of either capacitor and R is the cathode-anode impedance or so-called plate resistance of either tube. In the present embodiment the cathode-anode impedances of vacuum tubes 64, 64' are controlled by identical rectifier circuits including diodes 65, 65'. These diodes are fed with the equalized control sound signals from the circuits shown in Fig. 4. The output of Fig. 4 at plug 51 is fed through a suitable line to the plug 51' at the input of the circuit of Fig. 5. The equalized sound signals are supplied through two separate identical secondary windings of transformer 66 to the diodes.

Considering the upper diode circuit first, the output circuit of diode 65 includes a resistor 67 and shunt capacitor 68, this shunt circuit being in series between the diode and the winding 69 of the transformer. The time constant of the R=C combination 67, 68 is selected so that the diode functions as a peak rectifier. Capacitor 68 charges very rapidly through the relatively low impedance of diode 65 and secondary winding 69. The discharge of capacitor 68 is controlled largely by resistor 67.

It is desirable to make the discharge time constant longer than the period of one revolution of the record blank so that if a loud passage terminates abruptly, the increased groove pitch will be maintained until the passage has been recorded. With the values given, the discharge time constant is approximately five seconds as compared to 1.8 seconds for one revolution of the record blank. Consequently, if a loud passage abruptly terminates the pitch decreases to no more than about 70% of its initial value by the time the passage is recorded. A still longer time constant could be employed to obtain a still smaller decrease in the pitch after one revolution under such circumstances. However, longer time constants slow down the decrease in pitch for subsequent soft passages and hence decreases the overall playing time of the record. The selected time constant, which is about three times the period of one revolution, has been found satisfactory in practice and is preferred.

As above-mentioned, capacitor 68 charges very rapidly through diode 65. In the event of a sudden transition from a soft passage to a very loud passage, the resultant increase in control voltage may change the oscillator frequency so rapidly that the motor will drop out of synchronism. To prevent this, an integrating circuit is provided in the form of series resistor 71 and shunt capacitor 72. This prevents the control voltage as applied to the grid of control tube 64 from changing too rapidly. The time constant of the integrating circuit 71, 72 as shown is 0.6 second, or approximately one-third of the period of a revolution of the record blank. This has been found adequate to prevent the motor from dropping out of synchronism even under extreme changes in volume level. The time constant is shorter than the period of a revolution so that the pitch is increased by the desired amount in time for the recording of the passage.

The rectifier channel including diode 65' is the same as that just described for diode 65.

The output of oscillator 31 is supplied to an amplifier stage 73 through a gain control potentiometer 74. Amplifier tube 73 in turn drives the power output tube 75. The design of these stages may follow conventional practice and need not be described in detail. The output of the power amplifier 75 is supplied through output connection 76 to the synchronous motor which drives the lead screw of the recording cutter.

As shown in Fig. 6, for zero input signal the pitch should have a predetermined value which is here selected as about 3.0 mils. As the volume increases the pitch increases, the increase in pitch being proportional to the displacement required of the recording stylus. With the specific conditions here assumed, full level recording requires a displacement of 0.9 mil. The increase in groove spacing should be twice this displacement or 1.8 mils. Thus the groove pitch for 100% displacement of the stylus is approximately 4.8 mils as shown.

As above described, diodes 65, 65' function in peak detector circuits and the control sound signals supplied thereto are corrected in amplitude in accordance with the desired frequency-displacement record characteristic. Consequently, it is desirable to have the oscillator frequency vary linearly with the diode output voltage, so that the change in pitch will vary linearly with the peak amplitude of the equalized sound signal. From the equation of oscillator frequency given hereinbefore it will be observed that the frequency varies inversely as the plate resistance of either of tubes 64, 64'. The plate resistance of either tube is a nonlinear function of the control grid voltage. By proper selection of operating parameters, principally the plate voltage and grid bias, the plate resistance of both tubes 64, 64' may be made to vary substantially inversely as the applied grid voltage over the desired operating range. Thus the frequency of the oscillator may be made to vary substantially linearly with applied grid voltage.

The minimum groove pitch with no modulation may be set by adjusting the fixed grid bias of tubes 64, 64'. The circuit generally designated as 81 is provided for this purpose. The circuit also permits manual removal of the fixed bias so as to increase the groove pitch to the maximum for which the apparatus is designed. This is advantageous under certain operating conditions, for example, when the opening passage of a selection is very loud and requires maximum pitch to prevent overcutting.

The manual control unit 81 consists of two identical circuits, one for tube 64 and one for 64'. Considering the circuit for tube 64, a battery 82 of indicated polarity is in series with a potentiometer 83, an on-off switch $S_{1b}$ and an expansion switch $S_{2b}$. The movable contact of potentiometer 83 is in series with resistor 84 and is connected through line 85 and resistors 67, 71 to the grid of tube 64. The positive end of the potentiometer is connected through lead 86 to the cathode of tube 64. Consequently, with switches $S_{1b}$ and $S_{2b}$ closed, the setting of potentiometer 83 determines the fixed negative bias of tube 64 in the absence of signal. A capacitor 87 is provided to filter out any noise generated at the movable contact of the potentiometer. The other section of the manual control including battery 82' is identical with that just described and serves to control the fixed negative bias on tube 64'. Switch $S_{1a}$ is ganged to $S_{1b}$ for simultaneous operation, and switch $S_{2a}$ is ganged to $S_{2b}$ for simultaneous operation. Likewise, the arms of potentiometers 83 and 83' are ganged for simultaneous operation. As the bias on tubes 64, 64' is made more negative, the plate impedance of the tubes increases and the oscillator frequency is reduced. Thus the groove pitch is reduced.

In operation, the switches are closed and the potentiometers 83, 83' adjusted so that, in the absence of signal input, the oscillator frequency is such as to give the desired minimum pitch of 3.0 mils, or approximately 350 grooves per inch. Meter 88 is in series with the plate current circuit of tubes 64' and 64, and may be calibrated to read grooves per inch directly. If then a loud passage at the beginning of a selection or at any other place in the course of the recording makes it desirable to suddenly change the pitch manually, switches $S_{2a}$, $S_{2b}$ may be opened to remove the negative grid bias on tubes 64, 64'. The resultant zero grid bias causes the tubes to pass more current and their plate resistance decreases so as to give maximum oscillator frequency in the range provided. Accordingly, the synchronous motor is driven at maximum speed and gives the maximum pitch for which the apparatus is designed. When it is desired to resume automatic operation, switches $S_{2a}$, $S_{2b}$ are closed to reapply the fixed negative grid bias which has been preadjusted to given the desired minimum pitch. Rectifiers 65, 65' reduce the fixed negative bias by an amount dependent upon the peak amplitude of the equalized control sound signals so that the pitch is increased sufficiently to allow sound passages to be recorded without overcutting.

The frequency range of the oscillator depends on the desired range of the pitch variation, the speed of the motor, pitch of the lead screw, etc. as will be understood. For the specific embodiment described the oscillator frequency range is approximately 80–160 cycles per second, and the corresponding recording pitch range is 360–180 grooves per inch.

The term "Wien bridge" as used in the specification and claims refers to a bridge circuit having two legs essentially resistive, a third leg having resistance and capacitance in series, and a fourth leg having resistance and capacitance is shunt. A "Wien bridge oscillator" is essentially an amplifier whose output is coupled to the input through a Wien bridge. A discussion of such oscillators appears in an article entitled "A new type of selective circuit and some applications" by H. H. Scott, Proc. I. R. E., February, 1938, pp. 226–235 and also in "Electronic Measurements" by Terman and Pettit, McGraw-Hill, 1952, at pp. 482–485.

The invention has been described in connection with a specific embodiment in which detailed circuit arrangements and circuit components have been given which have been found satisfactory in one particular application. It will be apparent to those skilled in the art that the circuit arrangements and values of components may be departed from widely within the scope of the invention as meets the judgment of the designer and the conditions surrounding the application. While wholly separate channels have been illustrated for control and recording, if desired the initial portions can be combined into a single channel and subsequently the channels separated with appropriate provision for delay. While direct drive of the lead screw motor from the oscillator is preferred, other speed control means may be employed if desired. Further, various features of the invention may be employed in a given application and others omitted.

I claim:

1. Apparatus for the variable pitch recording of sound record grooves which comprises control and recording channels supplied with sound signals to be recorded, a recording head for forming modulated sound grooves in a record medium, said recording head having a non-linear displacement-frequency characteristic, a synchronous motor connected to produce transverse relative movement between the recording head and record medium to record sounds in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a rectifier circuit supplied from said control equalizer for deriving a control wave varying with the sound signal amplitude, a variable frequency oscillator, means utilizing said control wave to vary the frequency of said oscillator, and means utilizing the output of said oscillator to control the speed of said synchronous motor and thereby vary the pitch of the recorded grooves.

2. Apparatus for the variable pitch recording of sound record grooves which comprises control and recording channels supplied with sound signals to be recorded, the signals in said recording channel being delayed with respect to corresponding signals in the control channel, a recording head for forming modulated sound grooves in a record medium, said recording head having a non-linear displacement-frequency characteristic, a synchronous motor connected to produce transverse relative movement between the recording head and record medium to record sounds in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a peak rectifier circuit supplied with the equalized sound signals in said control channel to yield a control wave varying with the peak signal amplitude, a variable frequency oscillator, means utilizing said control wave to vary the frequency of said oscillator, and connections supplying the output of said oscillator to said motor to drive the motor in synchronism with the oscillator and thereby vary the pitch of the recorded grooves in accordance with the amplitude of signals being recorded.

3. Apparatus for the variable pitch recording of sound record grooves which comprises control and recording channels supplied with sound signals to be recorded, the signals in said recording channel being delayed with respect to corresponding signals in the control channel, a recording head for forming modulated sound grooves in a record medium, said recording head having a non-linear displacement-frequency characteristic, a synchronous motor connected to produce transverse relative movement between the recording head and record medium to record sound in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a peak rectifier circuit supplied with the equalized sound signals in said control channel to yield a control wave varying with the peak signal amplitude, a variable frequency oscillator having a feedback circuit including a resistance whose value affects the oscillator frequency, an electronic tube having a cathode, control grid and anode, the cathode-anode circuit of said tube being connected in said feedback circuit with the internal impedance thereof serving as said resistance, connections supplying said control wave to the control grid circuit of said tube to vary said impedance, and connections supplying the output of said oscillator to said motor to drive the motor in synchronism with the oscillator and thereby vary the pitch of the recorded grooves in accordance with the amplitude of signals being recorded.

4. Apparatus for the variable pitch recording of sound record grooves which comprises control and recording channels supplied with sound signals to be recorded, the signals in said recording channel being delayed with respect to corresponding signals in the control channel, a rotatable support for a record disc, a recording head for forming modulated sound grooves in said record disc, said recording head having a non-linear displacement-frequency characteristic, a synchronous motor connected to relatively move said recording head and rotatable support laterally to record sounds in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a pair of peak rectifier circuits supplied with the equalized sound signals in said control chanel to yield control waves varying with the peak signal amplitude, a variable frequency oscillator having a Wien bridge resistance-capacitance feedback circuit including a pair of capacitances of substantially equal value and a pair of resistances whose values affect the oscillator frequency, a pair of electronic tubes having respective cathodes, control grids and anodes, the cath-anode circuits of said tubes being connected in said feedback circuit with the internal impedances thereof serving as said resistances respectively, sources of operating voltages for said tubes predetermined so that said internal impedances vary substantially inversely with the applied grid-cathode voltages respectively, connections supplying said control waves to respective grid-cathode circuits of said tubes to vary the respective applied voltages and thereby vary the oscillator frequency, and connections supplying the output of said oscillator to said motor to drive the motor in synchronism with the oscillator and thereby vary the pitch of the recorded grooves in accordance with the amplitude of signals being recorded.

5. Apparatus for the variable pitch recording of sound record grooves which comprises control and recording channels supplied with sound signals to be recorded, the signals in said recording channel being delayed with respect to corresponding signals in the control channel, a rotatable support for a record disc, a recording head for forming modulated sound grooves in said record disc, said recording head having a non-linear displacement-frequency characteristic, a synchronous motor connected to relatively move said recording head and rotatable support laterally to record sounds in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a pair of peak rectifier circuits supplied with the equalized sound signals in said control channel, each rectifier circuit including an output shunt capacitance-resistance circuit whose discharge time constant is substantially longer than the period of one revolution of the record disc, a pair of similar electronic tubes each having a cathode, control grid and anode, connections supplying the output of said rectifier circuits through respective integrating circuits to the grid-cathode circuits of respective tubes to thereby control the internal cathode-anode impedances thereof, the time constants of said integrating circuits being less than said period of the record disc but a substantial fraction thereof, a variable frequency oscillator having a resistance-capacitance feedback circuit of the Wien bridge type including a pair of substantially equal capacitances and the cathode-anode circuits of said tubes serving as the resistance components thereof, sources of operating voltages for said tubes predetermined so that said internal impedances vary substantially inversely with the applied grid-cathode voltages respectively, and connections supplying the output of said oscillator to said motor to drive the motor in synchronism with the oscillator and thereby vary the pitch of the recorded grooves in accordance with the amplitude of signals being recorded.

6. Apparatus for the variable pitch recording of sound record grooves which comprises control and recording channels supplied with sound signals to be recorded, the signals in said recording channel being delayed with respect to corresponding signals in the control channel, a rotatable support for a record disc, a recording head for forming modulated sound grooves in said record disc, said recording head having a non-linear displacement-frequency characteristic, a synchronous motor connected to relatively move said recording head and rotatable support laterally to record sounds in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said record head characteristic, a pair of peak rectifier circuits supplied with the equalized sound signals in said control channel, each rectifier circuit including an output shunt capacitance-resistance circuit whose discharge time constant is substantially longer than the period of one revolution of the record disc, a pair of similar electronic tubes each having a cathode, control grid and anode, connections supplying the output of said rectifier circuits through respective integrating circuits to the grid-cathode circuits of respective tubes to thereby control the internal cathode-anode impedances thereof, the time constants of said integrating circuits being less than said period of the record disc but a substantial fraction thereof, a variable frequency oscillator having a resistance-capacitance feedback circuit of the Wien bridge type including a pair of substantially equal capacitances and the cathode-anode circuits of said tubes serving as the resistance components thereof, sources of anode voltage and grid bias for said tubes predetermined so that said internal impedances vary substantially inversely with the applied grid-cathode voltages respectively over the operating range thereof, switch means for rapidly decreasing said grid bias, and connections supplying the output of said oscillator to said motor to drive the motor in synchronism with the oscillator and thereby vary the pitch of the recorded grooves in accordance with the amplitude of signals being recorded.

7. Apparatus for the variable pitch recording of sound record grooves which comprises control and recording channels supplied with sound signals to be recorded, a recording head for forming modulated sound grooves in a record medium, said recording head having a non-linear displacement-frequency characteristic, means for relatively moving said recording head and record medium to record sound in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, and means utilizing the equalized sound signals in said control channel to vary the pitch of the recorded grooves in accordance with the amplitude of said signals.

8. Apparatus for the variable pitch recording of sound record grooves which comprises control and recording channels supplied with sound signals to be recorded, the signals in said recording channel being delayed with respect to corresponding signals in the control channel, a recording head for forming modulated sound grooves in a record medium, said recording head having a non-linear displacement-frequency characteristic, means for relatively moving said recording head and record medium to record sound in adjacent grooves, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a rectifier circuit supplied with the equalized sound signals in said control channel to yield control signals varying with the amplitude of said sound signals, and means utilizing said control signals to vary the pitch of the recorded grooves.

9. Apparatus for the variable pitch recording of sound record grooves which comprises control and recording channeds supplied with sound signals to be recorded, the signals in said recording channel being delayed with respect to corresponding signals in the control channel, a rotatable support for a record disc, a recording head for forming modulated sound grooves in said record disc, said recording head having a non-linear displacement-frequency characteristic, driving means for relatively moving said recording head and rotatable support transversely of said grooves to record sounds in adjacent grooves of said record disc, an equalizer in said recording channel connected to supply equalized sound signals to said recording head, said equalizer being designed to alter the sound signals in accordance with a predetermined non-linear displacement-frequency record characteristic and also to at least partially compensate for said non-linear recording head characteristic, a control equalizer in said control channel designed to alter the sound signals therein in accordance with said predetermined record characteristic without compensation for said recording head characteristic, a peak rectifier circuit supplied with the equalized sound signals in said control channel to yield control signals varying with the amplitude of said sound signals, and means utilizing said control signals to control the speed of said driving means and thereby vary the pitch of the recorded grooves substantially proportionally to the amplitude of the groove modulations.

10. Apparatus for the variable pitch recording of sound record grooves which comprises control and recording channels supplied with sound signals to be recorded, a recording head supplied with sound signals in said recording channel for forming modulated sound grooves in a record medium, a synchronous motor connected to produce transverse relative movement between the recording head and record medium to record sounds in adjacent grooves, a rectifier circuit in said control channel for deriving a control wave varying with the sound signal amplitude, a variable frequency oscillator, means utilizing said control wave to vary the frequency of said oscillator, and means utilizing the output of said oscillator to control the speed of said synchronous motor and thereby vary the pitch of the recorded grooves.

11. Apparatus for the variable pitch recording of sound record grooves which comprises control and recording channels supplied with sound signals to be recorded, the signals in said recording channel being delayed with respect to corresponding signals in the control channel, a recording head supplied with sound signals in said recording channel for forming modulated sound grooves in a record medium, a synchronous motor connected to produce transverse relative movement between the recording head and record medium to record sounds in adjacent grooves, a peak rectifier circuit in said control channel for deriving a control wave varying with the peak sound signal amplitude, a variable frequency oscillator, means utilizing said control wave to vary the frequency to said oscillator, and connections supplying the output of said oscillator to said motor to drive the motor in synchronism with the oscillator and thereby vary the pitch of the recorded grooves in accordance with the amplitude of signals being recorded.

12. Apparatus for the variable pitch recording of sound record grooves which comprises control and recording channels supplied with sound signals to be recorded, the signals in said recording channel being delayed with respect to corresponding signals in the control channel, a recording head supplied with sound signals in said recording channel for forming modulated sound grooves in a record medium, a synchronous motor connected to produce transverse relative movement between the recording head and record medium to record sounds in adjacent grooves, a peak rectifier circuit in said control channel for deriving a control wave varying with the peak sound signal amplitude, a variable frequency oscillator having a feedback circuit including a resistance whose value affects the oscillator frequency, an electronic tube having a cathode, control grid and anode, the cathode-anode circuit of said tube being connected in said feedback circuit with the internal impedance thereof serving as said resistance, connections supplying said control wave to the control grid circuit of said tube to vary said impedance, and connections supplying the output of said oscillator to said motor to drive the motor in synchronism with the oscillator and thereby vary the pitch of the recorded grooves in accordance with the amplitude of signals being recorded.

13. Apparatus for the variable pitch recording of sound record grooves which comprises control and recording channels supplied with sound signals to be recorded, the signals in said recording channel being delayed with respect to corresponding signals in the control channel, a recording head supplied with sound signals in said recording channel for forming modulated sound grooves in a record medium, a synchronous motor connected to produce transverse relative movement between the recording head and record medium to record sounds in adjacent grooves, a pair of peak rectifier circuits in said control channel for deriving control waves varying with the peak sound signal amplitude, a variable frequency oscillator having a resistance-capacitance feedback circuit including a pair of resistances whose values affect the oscillator frequency, a pair of electronic tubes having respective cathodes, control grids and anodes, the cathode-anode circuits of said tubes being connected in said feedback circuit with the internal impedances thereof serving as said resistances respectively, connections supplying said control waves to respective control grid circuits of said tubes to vary the impedances thereof and thereby vary the oscillator frequency, and connections supplying the output of said oscillator to said motor to drive the motor in synchronism with the oscillator and thereby vary the pitch of the recorded grooves in accordance with the amplitude of signals being recorded.

14. Apparatus for the variable pitch recording of sound record grooves which comprises control and recording channels supplied with sound signals to be recorded, the signals in said recording channel being delayed with respect to corresponding signals in the control channel, a recording head supplied with sound signals in said recording channel for forming modulated sound grooves in a record medium, a synchronous motor connected to produce transverse relative movement between the recording head and record medium to record sounds in adjacent grooves, a pair of peak rectifier circuits in said control channel for deriving control waves varying with the peak sound signal amplitude, a variable frequency oscillator having a Wien bridge resistance-capacitance feedback circuit including a pair of capacitances of substantially equal value and a pair of resistances whose values affect the oscillator frequency, a pair of electronic tubes having respective cathodes, control grids and anodes, the cathode-anode circuits of said tubes being connected in said feedback circuit with the internal impedances thereof serving as said resistances respectively, sources of operating voltages for said tubes predetermined so that said internal impedances vary substantially inversely with the applied grid-cathode voltages respectively, connections supplying said control waves to respective grid-cathode circuits of said tubes to vary the respective applied voltages and thereby vary the oscillator frequency, and connections supplying the output of said oscillator to said motor to drive the motor in synchronism with the oscillator and thereby vary the pitch of the recorded grooves in accordance with he amplitude of signals being recorded.

15. Apparatus for the variable pitch recording of sound record grooves which comprises control and recording channels supplied with sound signals to be recorded, the signals in said recording channel being delayed with respect to corresponding signals in the control channel, a rotatable support for a record disc, a recording head supplied with sound signals in said recording channel for forming modulated sound grooves in said record disc, a synchronous motor connected to relatively move said recording head and rotatable support laterally to record sounds in adjacent grooves, a pair of peak rectifier circuits supplied with the sound signals in said control channel, each rectifier circuit including an output shunt capacitance-resistance circuit whose discharge time constant is substantially longer than the period of one revolution of the record disc, a pair of similar electronic tubes each having a cathode, control grid and anode, connections supplying the outputs of said rectifier circuits through respective integrating circuits to the grid-cathode circuits of respective tubes to thereby control the internal cathode-anode impedances thereof, the time constants of said integrating circuits being less than said period of the record disc but a substantial fraction thereof, a variable frequency oscillator having a resistance-capacitance feedback circuit of the Wien bridge type including a pair of substantially equal capacitances and the cathode-anode circuits of said tubes serving as the resistance components thereof, sources of operating voltages for said tubes predetermined so that said internal impedances vary substantially inversely with the applied grid-cathode voltages respectively, and connections supplying the output of said oscillator to said motor to drive the motor in synchronism with the oscillator and thereby vary the pitch of the recorded grooves in accordance with the amplitude of signals being recorded.

16. Apparatus for the variable pitch recording of sound record grooves which comprises control and recording channels supplied with sound signals to be recorded, the signals in said recording channel being delayed with respect to corresponding signals in the control channel, a rotatable support for a record disc, a recording head supplied with sound signals in said recording channel for forming modulated sound grooves in said record disc, a synchronous motor connected to relatively move said recording head and rotatable support laterally to record sound in adjacent grooves, a pair of peak rectifier circuits supplied with the sound signals in said control channel, each rectifier circuit including an output shunt capacitance-resistance circuit whose discharge time constant is substantially longer than the period of one revolution of the record disc, a pair of similar electronic tubes each having a cathode, control grid and anode, connections supplying the outputs of said rectifier circuits through respective integrating circuits to the grid-cathode circuits of respective tubes to thereby control the internal cathode-anode impedances thereof, the time constants of said integrating circuits being less than said period of the record disc but a substantial fraction thereof, a variable frequency oscillator having a resistance-capacitance feedback circuit of the Wien bridge type including a pair of substantially equal capacitances and the cathode-anode circuits of said tubes serving as the resistance components thereof, sources of anode voltage and grid bias for said tubes predetermined so that said internal impedances vary substantially inversely with the applied grid-cathode voltages respectively over the operating range thereof, switch means for rapidly decreasing said grid bias, and connections supplying the output of said oscillator to said motor to drive the motor in synchronism with the oscillator and thereby vary the pitch of the recorded grooves in accordance with the amplitude of signals being recorded.

References Cited in the file of this patent

UNITED STATES PATENTS

| | | |
|---|---|---|
| 1,785,047 | Quinby | Dec. 16, 1930 |
| 2,112,699 | Kleber | Mar. 29, 1938 |
| 2,611,038 | Graham | Sept. 16, 1952 |